2 Sheets—Sheet 1.

W. W. St JOHN.
Steam-Piston Packing.

No. 228,571. Patented June 8, 1880.

WITNESSES:
Jas. E. Hutchinson.
Albert H. Norris.

INVENTOR:
Wm. W. St. John,
by James L. Norris.
Att'y.

2 Sheets—Sheet 2.
W. W. St JOHN.
Steam-Piston Packing.
No. 228,571. Patented June 8, 1880.
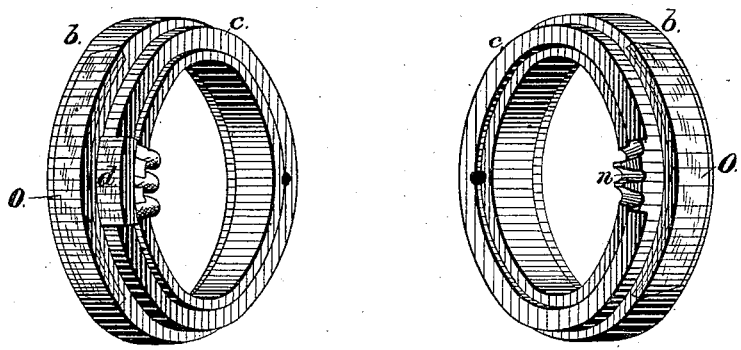
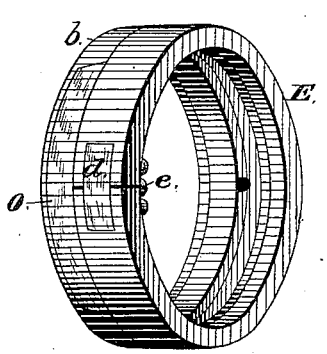
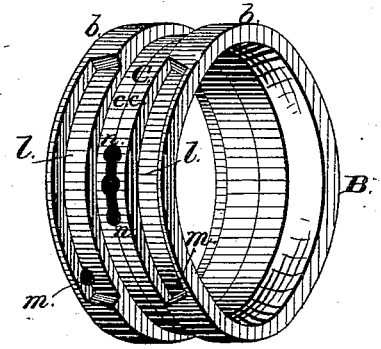
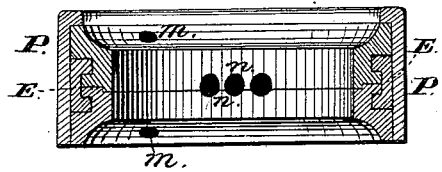
WITNESSES:
Jas. E. Hutchinson.
Ja. H. Norris.
INVENTOR-
Wm. W. St John,
by James L. Norris.
Att'y.

UNITED STATES PATENT OFFICE.

WILLIAM W. ST. JOHN, OF SEDALIA, MISSOURI.

STEAM-PISTON PACKING.

SPECIFICATION forming part of Letters Patent No. 228,571, dated June 8, 1880,

Application filed December 18, 1879.

*To all whom it may concern:*

Be it known that I, WILLIAM W. ST. JOHN, of Sedalia, in the county of Pettis and State of Missouri, have invented certain new and useful Improvements in Steam-Piston Packing, of which the following is a specification.

The object of my invention is to so pack a piston as to cause expansion of the same by the pressure of the steam, water, air, or gas which drives it through a cylinder, in order that it may prevent leakage of the impelling medium between its periphery and the surface of the cylinder, and at the same to prevent leakage between the piston and its packing; also, to prevent undue expansion of the piston, and consequent excessive friction between it and the cylinder; also, to pack stuffing-boxes in a similar manner and for a similar purpose.

In accomplishing these objects my invention consists, mainly, in a rigid packing ring or seat having in its periphery a circumferential groove, outward from the center of which projects an annular rib or shoulder approximately rectangular in cross-section, and an expansible annular metallic packing filling said groove, and having a groove in its inner periphery corresponding to and embracing the annular rib or shoulder of the rigid ring or seat. When steam or other liquid or fluid impelling medium presses upon one side of the piston in a cylinder it enters the nearest joint between the expansible packing and its seat, and, passing under said packing, causes it to expand and press snugly against the surface of the cylinder; but while expanding the packing the steam or other medium forces it laterally, so that the wall of its groove is caused to impinge upon the side of the annular rib or shoulder of the packing ring or seat and form a close joint, which prevents the further passage or leakage of the said impelling medium.

It also consists in certain details of construction, which will be hereinafter more particularly described.

Figure 1:
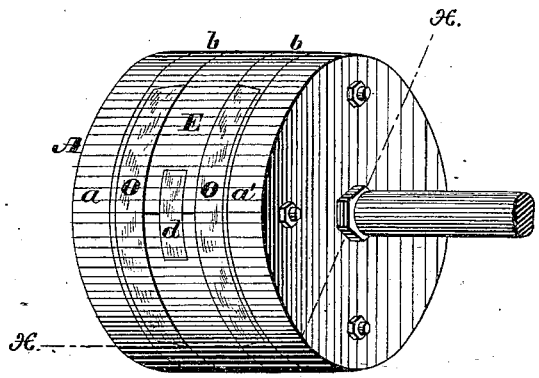
Figure 2:
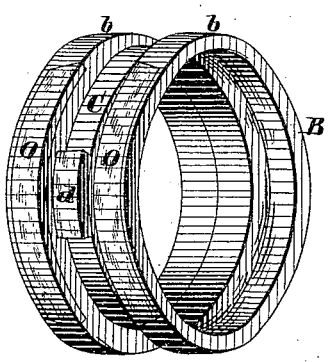
Figure 3:
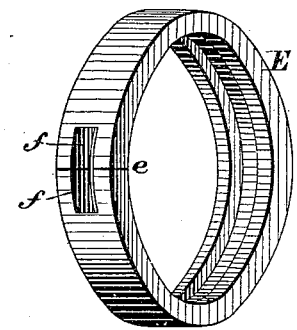
Figure 4:
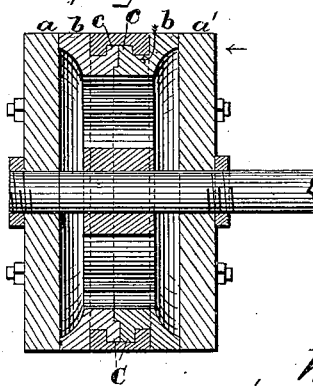

In the accompanying drawings, Figure 1 is a perspective view of a piston having my improved packing applied thereto. Fig. 2 is a similar view of the rigid ring or seat detached. Fig. 3 is a similar view of the expansible packing. Fig. 4 is a diametric section of the piston and packing. Fig. 5 is a perspective view of the two parts of the packing ring or seat separated. Fig. 6 is a view of one of the parts of the seat or ring with the expansible packing sprung upon it. Fig. 7 is a perspective view of two parts of the seat or ring as cast with recesses for securing their soft-metal bearings, and Fig. 8 is a view of these parts in the mold for forming the bearings.

The letter A indicates the piston-head. B is the packing-ring, secured in position flush with the periphery of the same by being grasped between the edges of the two disks $a\ a'$, which are connected by bolts. This packing ring or seat, for convenience in locating the packing, as hereinafter explained, I form of two annular parts, $b\ b$, the adjacent edges of which are severally rabbeted and provided with outward-extending flanges $c\ c$. The rabbets of these two parts form the central peripheral groove of the complete ring or packing-seat when the said parts are placed together, as shown, and the flanges $c\ c$ form the annular rib or shoulder C, projecting outward from the center of the bottom of this groove, said rib or shoulder being only about one-third or one-half as high as the walls of the groove, or even having a less height, as circumstances may require. From a portion of this rib projects outwardly an arc-shaped lug, $d$, having its perimeter in the same curved plane and coincident with the periphery of the ring or seat B. This lug is secured to one of the parts $b$, and the manner in which it is formed and located will be presently referred to.

The letter E designates the annular expansible metallic packing, the expansion of which is permitted by a transverse division or cut, $e$, through its body. In opposite directions from the cut $e$ are formed open slots $f$, which together form an opening of proper size to fit snugly around the lug $d$. This packing is of cast metal, and finished up by turning in a lathe, preferably being turned off tapering slightly toward the cut $e$ from a point diametrically opposite said cut, this taper allowing of any expansion of said packing.

In placing the parts of my packing together the two parts $b\ b$ of the seat are separated, and the elastic packing E is then sprung around its rabbeted portion, the slots $f$ embracing the lug $d$ and the flange of this rabbeted portion entering the internal groove of the packing. The other portion of the ring or seat is then forced into the packing, bringing the flanges $b\ b$ together in the groove of said packing. A pin, $g$, is then passed through coincident holes in the parts $b\ b$, to assist in preventing turning of said parts upon each other. When the packing is thus completed and secured to the piston, referring to Fig. 4, if the pressure of steam is in the direction of the arrow 1 upon said portion it will force its way between the seat B and packing E in the direction of the curved arrow, and, passing under the packing at the right-hand side of the rib C, force said packing outward against the surface of the cylinder, and at the same time the steam forces the packing laterally, so that the right-hand wall of its groove impinges forcibly against the side of the rib C, forming a very close joint, which prevents leakage of the steam between the packing and the ring or seat. Pressure of steam in the opposite direction upon the piston produces, of course, a similar effect.

While the lateral pressure of the packing against the rib of the ring prevents leakage, it also limits the quantity of steam passing under the packing, and consequently limits the outward pressure of the packing, so that there will not be excessive friction between the cylinder and said packing.

I have found it necessary, when my packing is to be used in cylinders which are somewhat worn, to provide the packing at that part which is its lower bearing in the cylinder with soft-metal bearings, which may more readily fit themselves to the worn surface of the cylinder than would the packing of hard material. In order to form such bearings I form arc-shaped recesses $l\ l$ in the outer periphery of each of the parts $b\ b$, and from the bottoms of these recesses passages $m$ are bored through inwardly. In the edge of each part is also formed a recess, $n$, and when the two parts are placed together these recesses form a passage through the rib C.

Now, to form the soft-metal bearings O and the arc-shaped lug $d$, which is also soft metal, I place the two parts of the packing ring or seat together, with the packing between them, so that the slots $f$ of said packing coincide with the recesses $n$, and slip all into a band or mold, P, which surrounds them snugly, secure them against turning by inserting the pin $g$, and then pour molten soft metal or composition suitable for bearings into the holes $m$ and recesses $n$. The soft metal fills up the recesses $l$ and passages thereto, and also the slots $f$ and recesses $n$, to form the bearings and lug, as shown in Figs. 1, 2, 5, and 6. By this mode of forming the bearings and lug they are rendered very easily replaceable when worn out or damaged, and the packing is readily adapted to worn cylinders.

While I have described my packing as applied to piston-heads, the principle of its construction enables it to be used with similar results as a packing for a stuffing-box, in which it will fit around a piston-rod. To adapt the packing for use in a stuffing-box the parts are reversed in position—that is, the rigid seat has its groove formed in its inner periphery, and from the bottom of the groove the rib corresponding in function to the rib C projects inwardly. The packing has its groove formed in its outer periphery, and said packing fits inside the rigid ring or seat. The packing and its seat in this case are both formed in segmental sections to enable them to be fitted together.

Having now described my invention, I claim—

A piston-packing composed of a rigid packing ring or seat having in its periphery a circumferential groove, from the center of the bottom of which projects an annular rib or shoulder, rectangular, or nearly so, in cross-section, and an expansible annular metallic packing filling said groove and having a groove in its periphery corresponding to and embracing the annular rib or shoulder of the said rigid ring or seat, substantially as described.

In testimony that I claim the foregoing I have hereunto set my hand in the presence of the subscribing witnesses.

WM. W. ST. JOHN.

Witnesses:
JAMES L. NORRIS,
ALBERT H. NORRIS.